(12) United States Patent
Hardy et al.

(10) Patent No.: US 7,361,065 B1
(45) Date of Patent: Apr. 22, 2008

(54) CONNECTOR ASSEMBLY FOR CONDUCTIVE PLATES

(75) Inventors: Douglas John Hardy, Middletown, PA (US); Alexandra L. M. Spitler, Palmyra, PA (US); John Wesley Hall, Harrisburg, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/592,517

(22) Filed: Nov. 3, 2006

(51) Int. Cl.
*H01R 11/22* (2006.01)
*H01R 13/11* (2006.01)

(52) U.S. Cl. .................. 439/856; 439/329
(58) Field of Classification Search ........ 439/856–857, 439/861–862, 329, 912, 212
See application file for complete search history.

(56) References Cited

U.S. PATENT DOCUMENTS

| | | | |
|---|---|---|---|
| 4,253,719 A | 3/1981 | McGinley | |
| 4,462,656 A * | 7/1984 | Beyer | 439/350 |
| 4,572,604 A | 2/1986 | Ammon et al. | |
| 5,024,610 A | 6/1991 | French et al. | |
| 5,269,712 A | 12/1993 | Denlinger et al. | |
| 5,564,952 A | 10/1996 | Davis | |
| 5,683,267 A | 11/1997 | Ribbeck et al. | |
| 5,743,751 A | 4/1998 | Davis et al. | |
| 5,749,751 A | 5/1998 | Shortt et al. | |
| 5,763,113 A | 6/1998 | Meltser et al. | |
| 5,908,322 A * | 6/1999 | Seki | 439/212 |
| 6,146,202 A | 11/2000 | Ramey et al. | |
| 6,231,355 B1 | 5/2001 | Trammel et al. | |
| 6,238,245 B1 | 5/2001 | Stokoe et al. | |
| 6,312,265 B1 | 11/2001 | Mohtar et al. | |
| 6,341,988 B1 | 1/2002 | Zhu et al. | |
| 6,688,897 B2 | 2/2004 | Korsunsky et al. | |
| 6,786,762 B2 | 9/2004 | Buck et al. | |
| 6,790,055 B1 | 9/2004 | Shin et al. | |
| 2002/0164517 A1 | 11/2002 | Sato et al. | |

* cited by examiner

Primary Examiner—Javaid H. Nasri

(57) ABSTRACT

A connector assembly for mating with a self-supporting plate fabricated from a conductive material, the plate formed with a plate mounting edge and first and second surfaces extending from the plate mounting edge includes an alignment housing mounted to the plate at the plate mounting edge, wherein the alignment housing defining a receiving chamber therein. The connector assembly also includes a plug housing having a contact held therein. The plug housing is received within the receiving chamber such that the contact slidably engages the first surface and the second surface of the plate.

20 Claims, 9 Drawing Sheets

CONNECTOR ASSEMBLY FOR CONDUCTIVE PLATES

BACKGROUND OF THE INVENTION

This invention relates generally to electrical connectors, and more specifically, to electrical connectors which interface to conductive plates.

Certain electrical systems include one or more conductive plates. For example, fuel cell technology utilizes a large number of conductive plates arranged in a stack. In these systems, it is sometimes desirable to monitor a voltage on the individual plates during operation. Consequently, it is desirable to electrically connect the conductive plates to external equipment for diagnostic, testing, and monitoring purposes. Such constructions introduce new demands on electrical connectors. Establishing reliable electrical and mechanical connection to the plates, however, has proven difficult.

For example, electrical connectors used for such purposes should be of a low mating force to permit easy installation onto the plates, yet mechanically stable when attached to the conductive plates and not prone to separating from the plates in use. The connector should also be reliably engaged to the plates and disengaged from the plates as needed or as desired, while still providing the desired electrical connection and mechanical stability. Known connectors are not suitable for these purposes.

In systems having stacked electrical components, such as fuel cells, there is a trend to reduce the overall size of the system. To accomplish such a reduction, the spacing of adjacent plates is decreased, the thickness of the plates is decreased, or both. Problems arise in providing reliable connectors that may be securely coupled to the plates having such reduced spacing or reduced thickness.

BRIEF DESCRIPTION OF THE INVENTION

In one aspect, a connector assembly is provided for mating with a self-supporting plate fabricated from a conductive material, wherein the plate is formed with a plate mounting edge and first and second surfaces extending from the plate mounting edge. The connector assembly includes an alignment housing mounted to the plate at the plate mounting edge, wherein the alignment housing defining a receiving chamber therein. The connector assembly also includes a plug housing having a contact held therein. The plug housing is received within the receiving chamber such that the contact slidably engages the first surface and the second surface of the plate.

In another aspect, a connector assembly is provided for mating with a self-supporting plate fabricated from a conductive material, wherein the plate is included in a stack of plates, and wherein each plate is spaced from one another by a nominal pitch value. Each plate includes a plate mounting edge and first and second surfaces extending from the plate mounting edge. The connector assembly includes a contact having first and second contact beams, wherein the first and second contact beams are configured to engage opposite surfaces of the plate adjacent the plate mounting edge. An alignment housing is mounted to the respective plate at the plate mounting edge, and the alignment housing defines a receiving chamber therein. The connector assembly also includes a plug housing having the contact held therein. The plug housing is received within the receiving chamber such that the contact slidably engages the first surface and the second surface of the plate.

In a further aspect, a contact is provided for mating with a self-supporting plate fabricated from a conductive material. The plate is formed with a plate mounting edge and first and second surfaces extending from the plate mounting edge. The contact includes a contact mounting edge and a wire interface edge opposite the contact mounting edge. The contact also includes a first contact beam and a second contact beam extending from the contact mounting edge. The first contact beam is configured to engage the first surface of the self-supporting plate when passed over the plate mounting edge, and the second contact beam is configured to engage the second surface of the self-supporting plate when passed over the plate mounting edge, thereby mechanically and electrically interfacing the contact to the self supporting plate. A wire barrel extends from the wire interface edge, and is configured to directly couple to a wire.

DETAILED DESCRIPTION OF THE INVENTION

Figure 1:
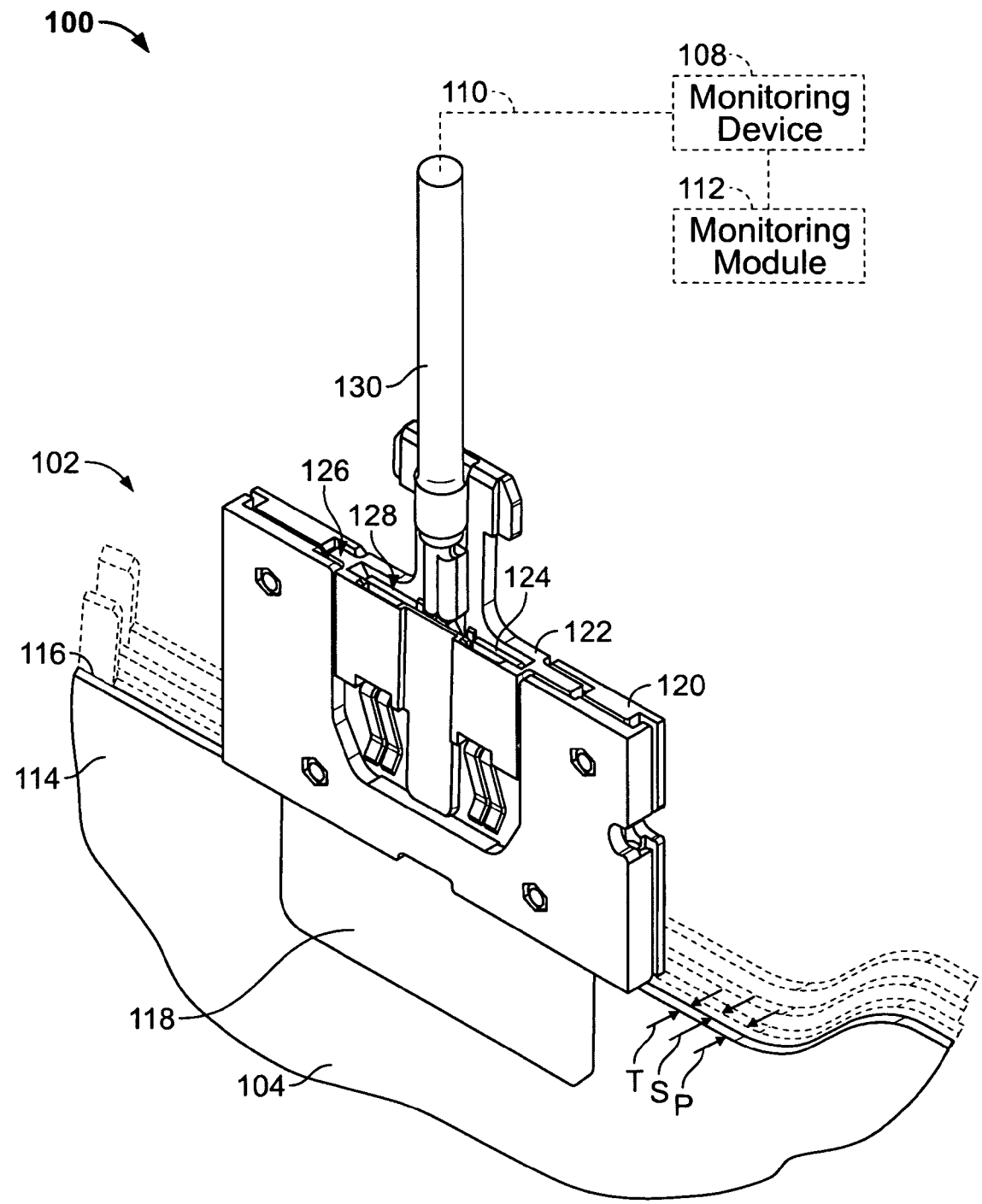
FIG. 1 is a perspective view of a connector assembly for an electrical system and formed in accordance with an exemplary embodiment.

FIG. 1 is a perspective view of a connector assembly 100 for an electrical system 102 and formed in accordance with an exemplary embodiment. The connector assembly 100 may be used to reliably establish mechanical and electrical connection to conductive plates 104 in the system 102 and overcomes the aforementioned problems and difficulties of known connectors when used in such a system. In the illustrated embodiment, the electrical system 102 represents a monitoring system from a fuel cell having a plurality of self supporting conductive plates 104 with connector assemblies 100 mounted to each conductive plate 104. Only one conductive plate 104 and corresponding connector assembly 100 is illustrated in FIG. 1, however multiple conductive plates 104 are illustrated in phantom. It is realized that any number of conductive plates 104 may be utilized depending on the particular requirements of the fuel cell.

In the embodiment shown in FIG. 1, the connector assembly 100 is used to interface the fuel cell with a monitoring device 108 via interface links 110. The interface links 110 are connected, in turn, to a monitoring module 112 which processes signals transmitted from the fuel cell through the connector assembly 100 and the interface links 110. The monitoring device 112 may provide functions such as voltage monitoring, diagnostic testing, and the like. The monitoring device 108, interface links 110 and the monitoring module 112 are schematically illustrated in FIG. 1. The monitoring module 112 may be used to monitor the operation of the fuel cell for monitoring, testing and/or diagnostic purposes. While the connector assembly 100 is described and illustrated herein in the context of interfacing a fuel cell with a monitoring module, it is contemplated that the benefits of the invention accrue to other applications of the connector assembly 100, and the monitoring module is but one exemplary apparatus in which the benefits of the connector assembly 100 may be realized. For example, the connector assembly 100 may interconnect with other electronic equipment, and the connector assembly 100 may be used for current passing. Consequently, the description set forth herein is for illustrative purposes only and is not intended to be limited to any particular end use or application.

The fuel cell is a known unit which reacts a gaseous fuel, such as reformed natural gas, with air to produce electrical power in a known manner. The fuel cell includes a number of conductive plates 104, and each of the conductive plates 104 includes a first surface 114 and a second surface 116. The conductive plates 104 are fabricated from a conductive material, such as stainless steel. Optionally, each plate 104 may include two plate portions that are welded together. The conductive plates 104 may be low profile, stainless steel plates having a thickness of less than 2 millimeters. Alternatively, non-low profile conductive plates may be used and plates made from composite material, such as a known conductive polymeric material or polymeric composition rather than from conventional metallic materials may be used.

Each plate 104 in the fuel cell has a predetermined nominal thickness T, and the plates 104 are arranged in a stack with a predetermined nominal spacing value S between the plates 104, the sum of which is sometimes referred to as a nominal pitch value P for the plates 104. That is, the stack of plates 104 is designed to have a reoccurring dimension P measured in a direction perpendicular to the plane of the plates 104 from an edge of one plate 104 across the thickness T of the plate 104 to the edge of an adjacent plate 104. In theory, according to design parameters, the plates 104 are repeated at a uniform distance P in the fuel cell stack. In reality, each of the plate thickness T and the spacing S of the plates 104 is subject to manufacturing tolerances, and an actual pitch dimension P may deviate somewhat from the nominal value of the sum of the plate thickness T and the nominal spacing value S for any two adjacent plates 104 in the fuel cell.

In an exemplary embodiment, a plate contact 118 may be attached to each of the plates 104. Alternatively, the plate contact 118 may be integrally formed with the plate 104 and merely define a plate contact portion of the plate 104. The plate contact 118 defines an upstanding tab to which the connector assembly 100 is attached. The connector assembly 100 thereby permits interconnection of the monitoring module 112 and the plate 104 to monitor a voltage on the corresponding plate 104 of the fuel cell during operation.

As described above, a discrete connector assembly 100 is connected to each of the plates 104 in the stack. By having a one-to-one correlation of plates 104 and connector assemblies 100, the connector assemblies 100 may be fixed to the plates 104 so that the positions of each connector assembly 100 relative to the respective plate 104 is assured even though the position of the plates 104 relative to one another (i.e., the dimension P between adjacent plates) may vary. Reliable and secure mechanical and electrical connections between the plates 104 and the connector assemblies 100 may therefore be established despite some deviation in the nominal pitch spacing P of the plates 104. In alternative embodiments, the connector assembly 100 may be designed for ganged mating, wherein the connector assembly 100 connects to multiple plates 104 in the stack.

The connector assembly 100 includes an alignment housing 120, a plug housing 122 and a contact 124. The alignment housing 120 is securely coupled to the plate 104. Optionally, the alignment housing 120 may be securely coupled to the plate contact 118, as described in further detail below. The plug housing 122 is separately provided from the alignment housing 120 and is received within a receiving chamber 126 of the alignment housing 120 during assembly. The plug housing 122 is easily installed once the alignment housing 120 is coupled to the plate 104, and more particularly, to the plate contact 118. The plug housing 122 may be manufactured economically while providing secure engagement of the contact 124 to the plate contact 118. Additionally, the plug housing 122 may be easily removed for repair or replacement of the components of the system 102. The plug housing 122 is removably coupled to the alignment housing 120. The alignment housing 120 orients the plug housing 122 with respect to the plate 104 when the plug housing 122 is received within the receiving chamber 126. The contact 124 is received within a contact chamber 128 of the plug housing 122. The contact 124 is removably coupled to the plug housing 122. The plug housing 122 orients the contact 124 with respect to the plate 104 when the contact 124 is received within the contact chamber 128. The contact 124 is terminated to a wire 130, such as by a crimping process, which is illustrated in FIG. 1, a soldering process, an insulation displacement process, a poke-in-wire process, and the like. The wire 130 may form part of the interface link 110.

Figure 2:
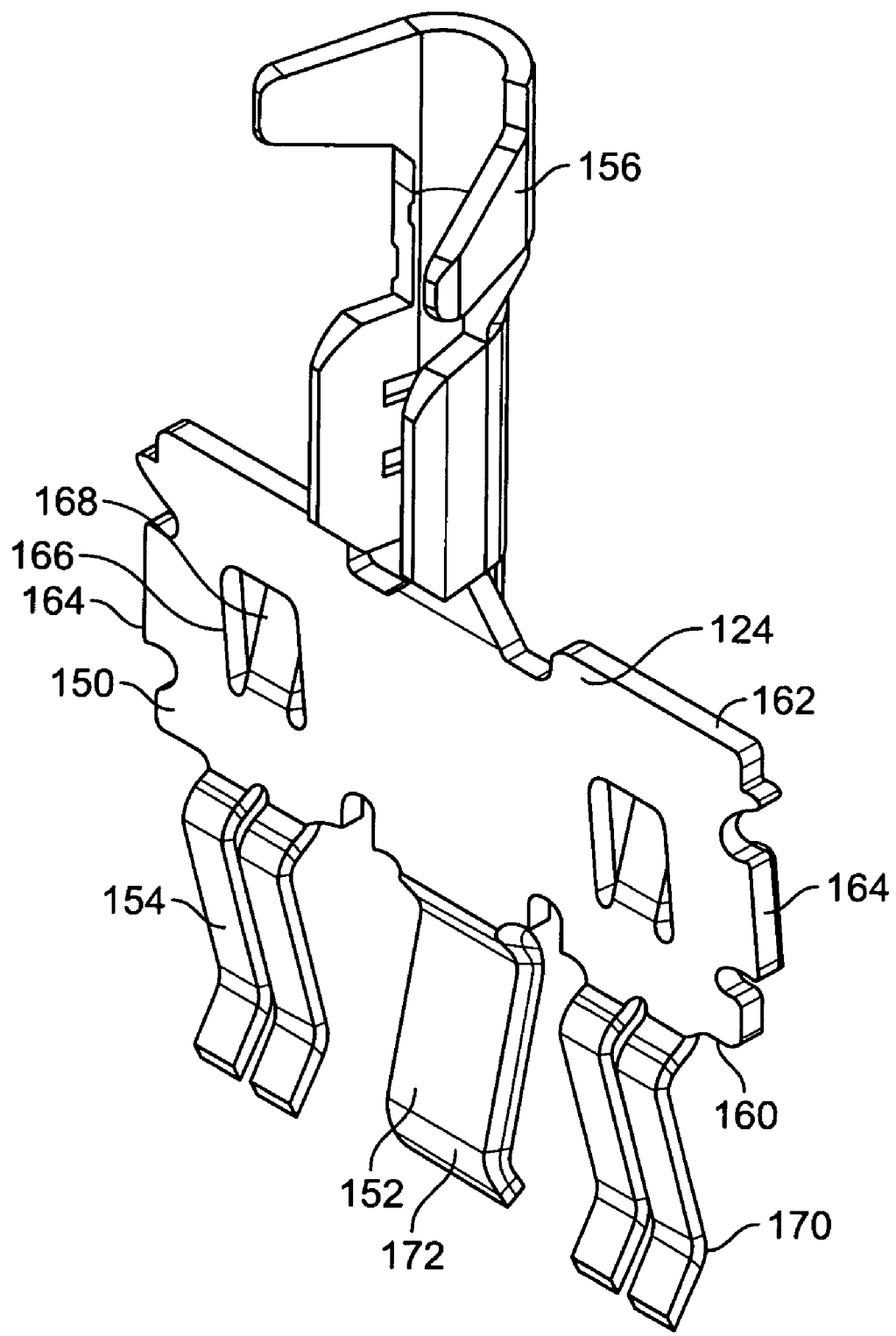
FIG. 2 is a perspective view of a contact for the connector assembly shown in FIG. 1.

FIG. 2 is a perspective view of the contact 124 for the connector assembly 100 (shown in FIG. 1). The contact 124 includes a body section 150, a center contact beam 152 extending downward from the body section 150 and first and second outer contact beams 154 extending from the body section 150 on either side of the center contact beam 152. The contact beams 152 and 154 are constructed to pass over or be moved over and received upon the plate contact 118 (shown in FIG. 1). When passed over the plate contact 118, the center contact beam 152 engages the second surface 116 (shown in FIG. 1) of the plate contact 118, and the outer contact beams 154 engage the opposite first surface 114 (shown in FIG. 1) of the plate contact 118, as will be explained in further detail below. The contact 124 also includes a wire termination portion 156 extending upward from the body section 150 generally opposite the center contact beam 152. Alternatively, the wire termination portion 156 may have a different orientation as compared to the body section 150 and/or the contact beam 152. The wire termination portion 156 provides an electrical connection with the wire 130 (shown in FIG. 1). In the illustrated embodiment, the wire termination portion 156 is a wire barrel for terminating to the wire 130 by crimping the wire barrel to the wire 130. However, alternative wire termination methods are contemplated using structures other than a wire barrel, such as soldering process, an insulation displacement process, a poke-in-wire process, and the like. The contact 124, including the body section 150, the contact beams 152 and 154, and the wire termination portion 156 may be stamped, formed and plated using conductive materials according to known manufacturing processes and techniques.

The body section 150 is generally planar and rectangular in an exemplary embodiment, and includes a contact mounting edge 160, a wire interface edge 162, and side edges 164 extending between the contact mounting edge 160 and the wire interface edge 162. The wire termination portion 156 extends from the wire interface edge 162 of the body section 150. The body section 150 includes a number of openings 166 extending therethrough. The openings 166 have lances or beams 168 received within the openings 166, and the lances 168 extend outward from the plane of the body section 150. The lances 168 are used to retain the contact 124 within the plug housing 122 (shown in FIG. 1) after assembly of the connector assembly 100.

The outer contact beams 154 extend from the contact mounting edge 160, and are distanced laterally from the center contact beam 152 such that the center contact beam 152 is located between the outer contact beams 154. In one embodiment, each outer contact beam 154 includes a pair of contact beams. The contact beams 154 extend obliquely to the body section 150 and include rounded contact surfaces 170 which engage one of the sides of the plate contact 118. The contact surfaces 170 wipe against the plate contact 118 as the contact 124 is installed, and the oblique angle of the beams 154 generates a normal contact force against the plate contact 118 as the beams 154 are engaged to the plate contact 118 and the beams 154 are deflected.

The center contact beam 152 also extends obliquely to the body section 150 and includes a rounded contact surface 172 which engages a surface of the plate contact 118. The contact surface 172 wipes against the plate contact 118 as the contact 124 is installed, and the oblique angle of the beam 152 generates a normal contact force against the plate contact 118 as the beam 152 is engaged to the plate contact 118 and the beam 152 is deflected.

In an exemplary embodiment, the center contact beam 152 and the outer contact beams 154 are angled in opposing directions from one another along the contact mounting edge 160. The contact surfaces 170 of the outer contact beams 154 and the contact surface 172 of the center contact beam 152 therefore face in opposing directions from one another, and the beam 152 and the beams 154 are deflected in opposite directions when they are inserted over the plate contact 118. Thus, by virtue of the contact beams 152, 154 being angled in different directions, contact normal force is provided in opposing directions when the beams 152 and 154 are deflected. The size and geometry of the beams 152, 154 are designed to create a contact normal force that provides adequate mechanical and electrical connection of the contact 124 and the plate contact 118. The contact 124 is therefore installed onto the plate contact 118 as a clip, and to a certain degree is self retaining in a stable manner due to the lateral offset of the outer pairs of contact beams 154 with respect to the center contact beam 152. Moreover, multiple contact surfaces 170, 172 provided by multiple beams 154 and 152 provides redundant points of contact and ensures an adequate electrical connection to the plate contact 118 when the contact 124 is installed on the plate contact 118. While five contact beams (one center beam 152 and four outer beams 154) are illustrated in FIG. 2, it is understood that greater or fewer contact beams could be provided in alternative embodiments.

Figure 3:
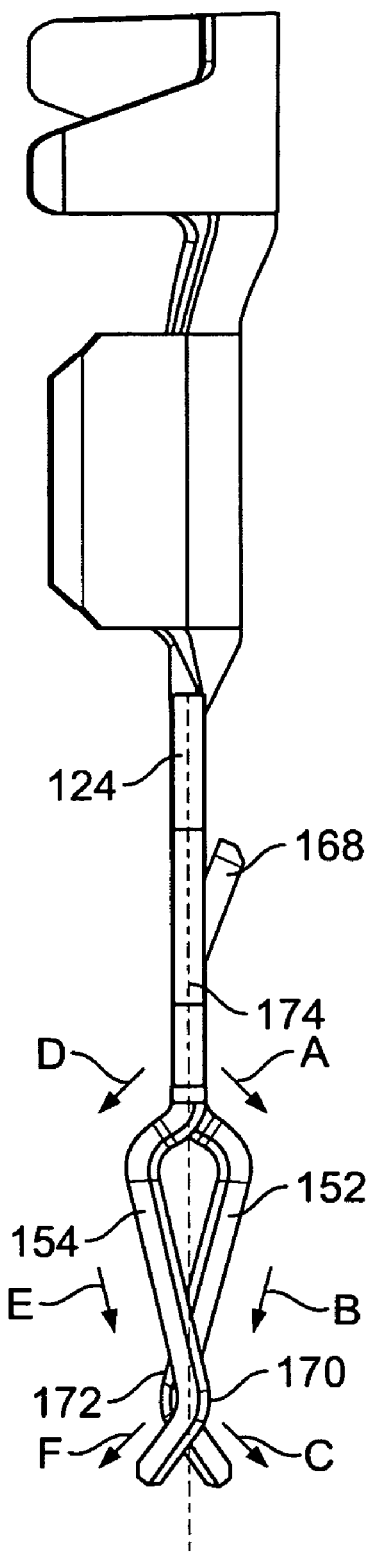
FIG. 3 is a side elevation view of the contact shown in FIG. 2.

FIG. 3 is a side elevation view of the contact 124 illustrating an exemplary orientation of the center contact beam 152 and the outer contact beams 154. Each of the beams 152 and 154 have a curved profile. The center contact beam 152 is angled from the body section 150 in a first direction, shown by arrow A, and then angles back in an opposite direction, shown by arrow B, such that the beam 152 crosses a body center line 174 of the body section 150. Optionally, the beam 152 may cross the body center line 174 proximate the contact surface 172. The portion of the beam 152 between the contact surface 172 and the distal end of the beam 152 may angle away from the body center line 174, shown by arrow C. The portion of the beam 152 between the contact surface 172 and the distal end of the beam 152 may define a ramp for engaging the plate contact 118 (shown in FIG. 1) during mating of the contact 124 and the plate contact 118.

The outer contact beams 154 are angled from the body section 150 in a direction that is opposite to the direction that the center contact beam 152 is angled, which is shown by arrow D. The contact beams 154 then angle back in an opposite direction, shown by arrow E, such that the beams 154 cross the body center line 174 of the body section 150. Optionally, the beams 154 may cross the body center line 174 proximate the contact surfaces 170. The portions of the beams 154 between the contact surfaces 170 and the distal ends of the beams 154 may angle away from the body center line 174, shown by arrow F. The portions of the beams 154 between the contact surface 170 and the distal ends of the beams 154 may define ramps for engaging the plate contact 118 (shown in FIG. 1) during mating of the contact 124 and the plate contact 118.

The lances 168 extend outward from the plane of the body section 150. The lances 168 are deflectable inward, generally toward the body section 150, during loading of the contact 124 into the plug housing 122 (shown in FIG. 1).

Figure 4:
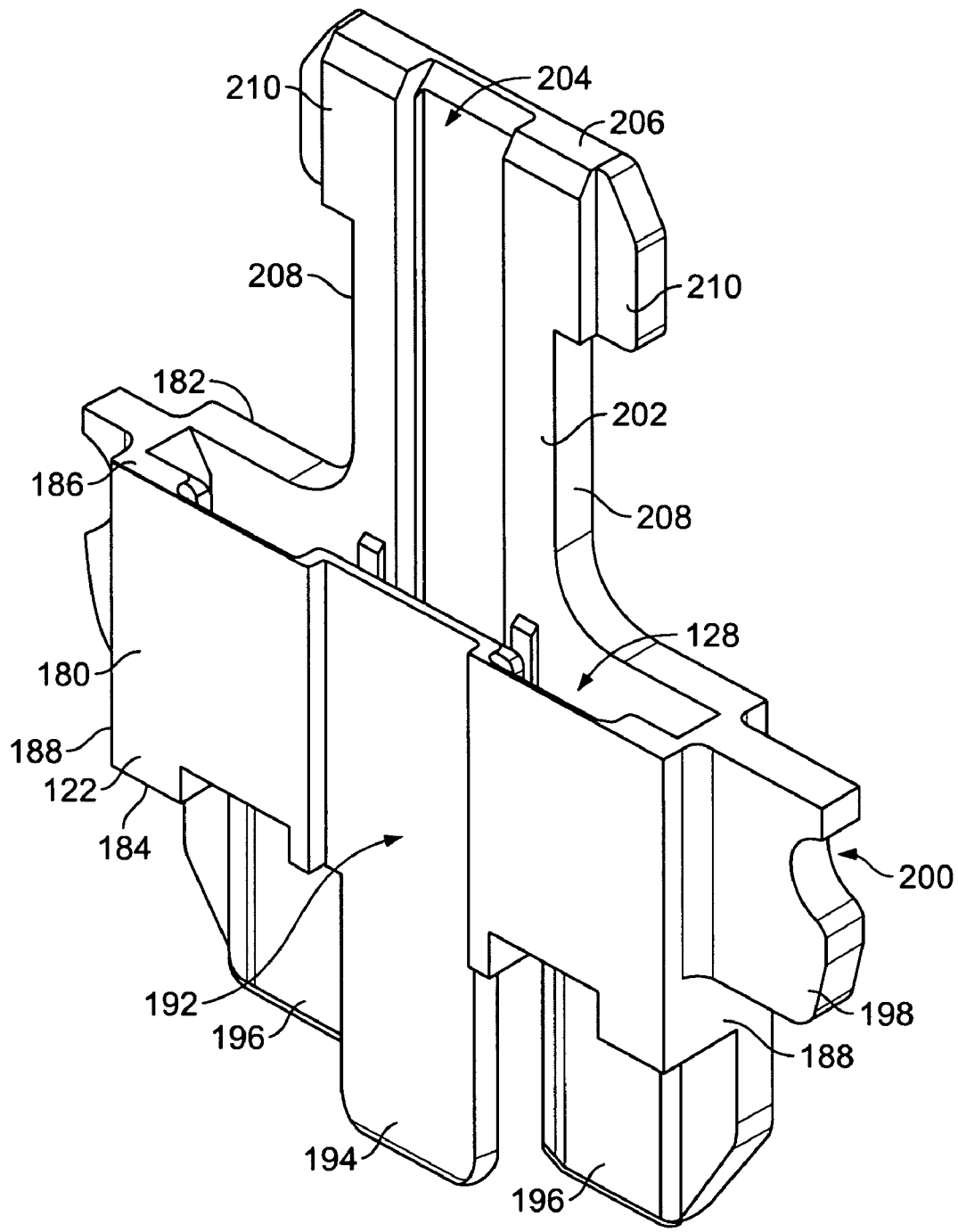
FIG. 4 is a perspective view of a plug housing for the connector assembly shown in FIG. 1.

FIG. 4 is a perspective view of the plug housing 122 for the connector assembly 100 (shown in FIG. 1). The plug housing 122 includes opposite side faces 180 and 182 spaced apart from one another by a distance. Optionally, the distance may be approximately equal to the pitch P of the conductive plates 104 (shown in FIG. 1). Alternatively, the distance may be approximately twice the pitch P. The distance may be less than the pitch P in some alternative embodiments. The plug housing 122 includes a plate mating face 184 extending between the side faces 180, 182 on a bottom of the plug housing 122 and a contact mating face 186 extending between the side faces 180, 182 on a top of the plug housing 122 generally opposite the plate mating face 184. The plug housing 122 further include end edges 188 extending between the side faces 180, 182 on opposing ends of the plate mating face 184 and the contact mating face 186. The side faces 180, 182, the mating faces 184, 186, and the end edges 188 encompass the contact chamber 128 therebetween for the contact 124 (shown in FIGS. 1-3).

One of the side faces 180 of the plug housing 122 includes a slot 192, while the other of the side faces 182 includes an insulating projection (not shown). The insulating projection is similarly shaped and sized as the slot 192 for nesting within the slot when the plates 104 are stacked.

The plug housing 122 includes a center flange 194 and outer flanges 196 that depend downwardly from the plate mating face 184 in a direction away from the plug mating face 184. The center flange 194 extends from the plate mating surface 184 at the side face 180 and the outer flanges extend from the plate mating surface 184 at the side face 182. The flanges 194, 196 overlie, and are oriented to insulate, the center contact beam 152 and the outer contact beams 154, respectively (shown in FIGS. 2-3). For example, the flange 194 is oriented to prevent the contact beam 152 from contacting an adjacent plate 104 (shown in FIG. 1) within the stack, thus preventing shorting of the fuel cell. Similarly, the flanges 196 are oriented to prevent the contact beams 154 from contacting an adjacent plate 104 within the stack.

Mounting arms 198 depend outwardly from the end edges 188 of the plug housing 122 in a direction away from the end edges 188. Optionally, the mounting arms 198 may have different lengths. The different lengths may serve as a keying feature for mating the plug housing 122 with the alignment housing 120. The mounting arms 198 include notches 200 that snappably engage the alignment housing 120, as described in further detail below, to retain the plug housing 122 within the alignment housing 120.

The plug housing 122 includes an insulation tab 202 depending upwardly from the contact mating face 186 in a direction away from the contact mating face 186. The insulation tab 202 includes a slot 204 extending along the length of the tab 202 from a top edge 206. The slot 204 is substantially centered between side edges 208 of the tab 202. The tab 202 is provided to insulate the wire termination portion 156 (shown in FIGS. 2-3) from adjacent wire termination portions within the stack. When the contact 124 is installed into the contact chamber 128, a portion of the wire termination portion 156 is received within the slot 204. The slot 204 may operate to stabilize the wire termination portion 156 from moving during handling and use of the connector assembly 100. The tab 202 also includes shoulders 210 extending from the side edges 208 proximate the top edge 206. Optionally, the shoulders 210 may be engaged by an installation/removal tool for installing or removing the plug housing 122 from the alignment housing 120.

Figure 5:
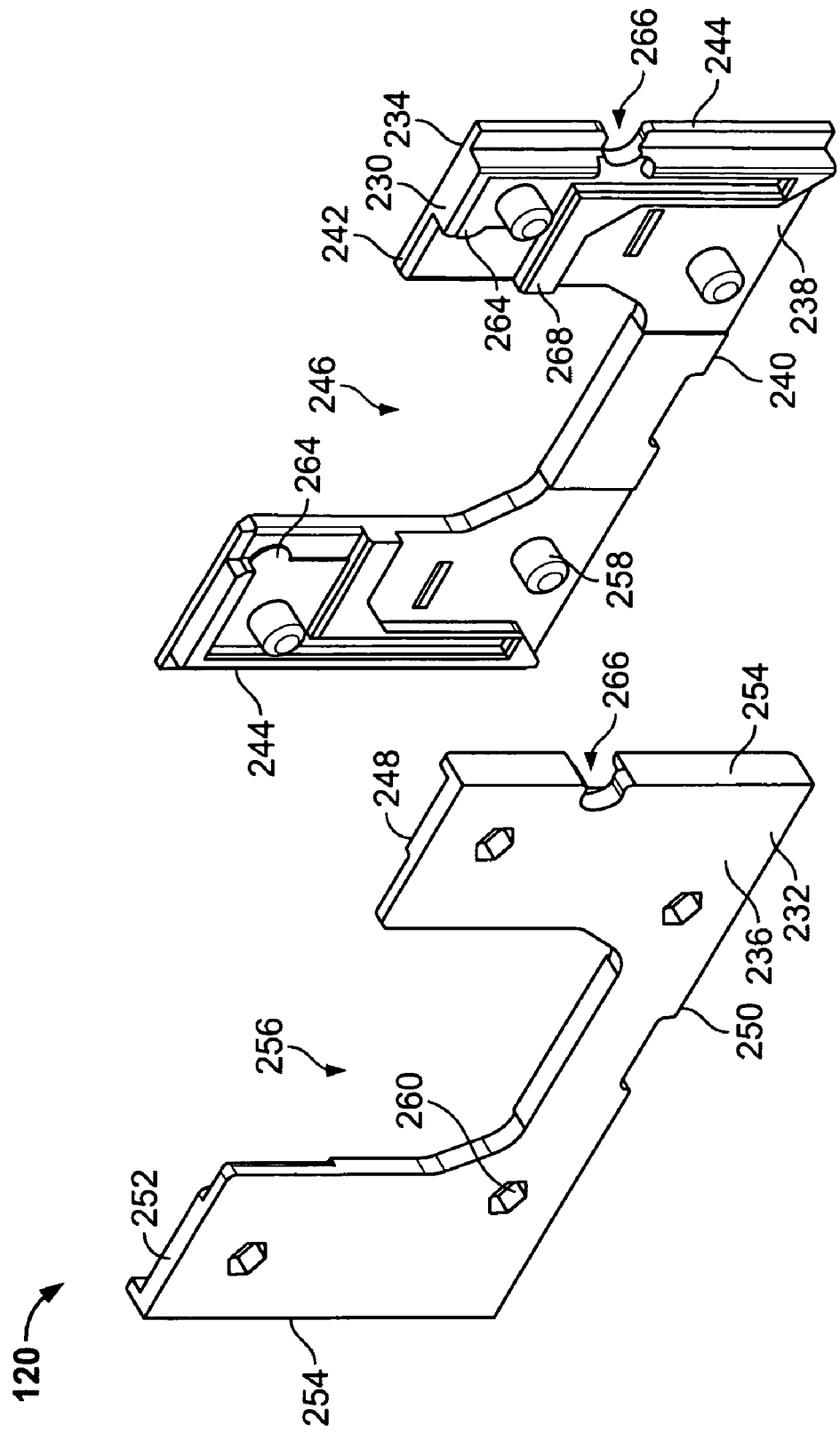
FIG. 5 is an exploded perspective view of an alignment housing for the connector assembly shown in FIG. 1.

FIG. 5 is an exploded perspective view of the alignment housing 120 for the connector assembly 100 (shown in FIG. 1). The alignment housing 120 is a two-piece member including a first housing portion 230 and a second housing portion 232. The housing portions 230, 232 have a substantially similar size and shape and are coupled to one another to form the alignment housing 120. When assembled, the first housing portion 230 defines a first side face 234 of the alignment housing 120 and the second housing portion 232 defines a second side face 236 of the alignment housing 120. The side faces 234 and 236 are spaced apart from one another by a distance that is chosen such that the alignment housing 120 does not interfere with the stacking of the plates 104 (shown in FIG. 1). Optionally, the distance may be substantially equal to the pitch P of the conductive plates 104. The distance may be approximately twice the pitch P, or the distance may be less than the pitch P in alternative embodiments.

The first housing portion 230 includes an inner surface 238 opposite the first side face 234. A plate mating face 240 extends between the side face 234 and the inner surface 238 on a bottom of the first housing portion 230. A plug mating face 242 extends between the first side face 234 and the inner surface 238 on a top of the first housing portion 230. The first housing portion 230 further includes end edges 244 extending between the first side face 234 and the inner surface 238 on opposing ends. An opening 246 is provided in the first housing portion 230. The opening 246 extends from the plug mating face 242 and is substantially centered between, and spaced apart from, the end edges 244. When the alignment housing 120 is mated to the plate 104 (shown in FIG. 1), the opening 246 provides access to the plate 104.

The second housing portion 232 includes an inner surface 248 opposite the second side face 236. A plate mating face 250 extends between the side face 236 and the inner surface 248 on a bottom of the second housing portion 232. A plug mating face 252 extends between the second side face 236 and the inner surface 248 on a top of the second housing portion 232. The second housing portion 232 further includes end edges 254 extending between the second side face 236 and the inner surface 248 on opposing ends. An opening 256 is provided in the second housing portion 232. The opening 256 extends from the plug mating face 252 and is substantially centered between, and spaced apart from, the end edges 254. When the alignment housing 120 is mated to the plate 104, the opening 256 provides access to the plate 104.

In an exemplary embodiment, the alignment housing portions 230, 232 include features used to couple the housing portions 230, 232 together. Optionally, the first housing portion 230 may include dowel pins 258 extending from the inner surface 238. Optionally, the dowel pins 258 may be cylindrical, but other shapes may be provided. The second housing portion 232 may include receptacles 260 for receiving the dowel pins 258. The dowel pins 258 may be secured within the receptacles 260 by a friction or press fit. Alternatively, both housing portions 230, 232 may include dowel pins 258 and receptacles 260. In other alternative embodiments, other retention or coupling features may be used in lieu of, or in addition to, the dowel pins 258 and the receptacles 260. When the first and second housing portions 230, 232 are joined, the inner surfaces 238, 248 define the receiving chamber 126 (shown in FIG. 1), therebetween for the plug housing 122 and the contact 124 (shown in FIG. 1). The alignment housing portions 230, 232 may include plug mounting tabs 264 that extend into the receiving chamber 126 and interact with the mounting arms 198 of the plug housing 122 (shown in FIG. 4). Optionally, the alignment housing portions 230, 232 may include a notch 266 in one or both of the end edges 244, 254. The notch 266 may provide a visual indication of proper orientation during assembly of the alignment housing 120 and the plate 104. The notch 266 may be used to align and/or assist an installation/removal tool for the alignment housing 120. The alignment housing portions 230, 232 may include internal walls 268 extending from the inner surfaces 238, 248. The walls 268 engage the plate contact 118 (shown in FIG. 1) and orient the alignment housing 120 with respect to the plate contact 118 during assembly.

Figure 6:
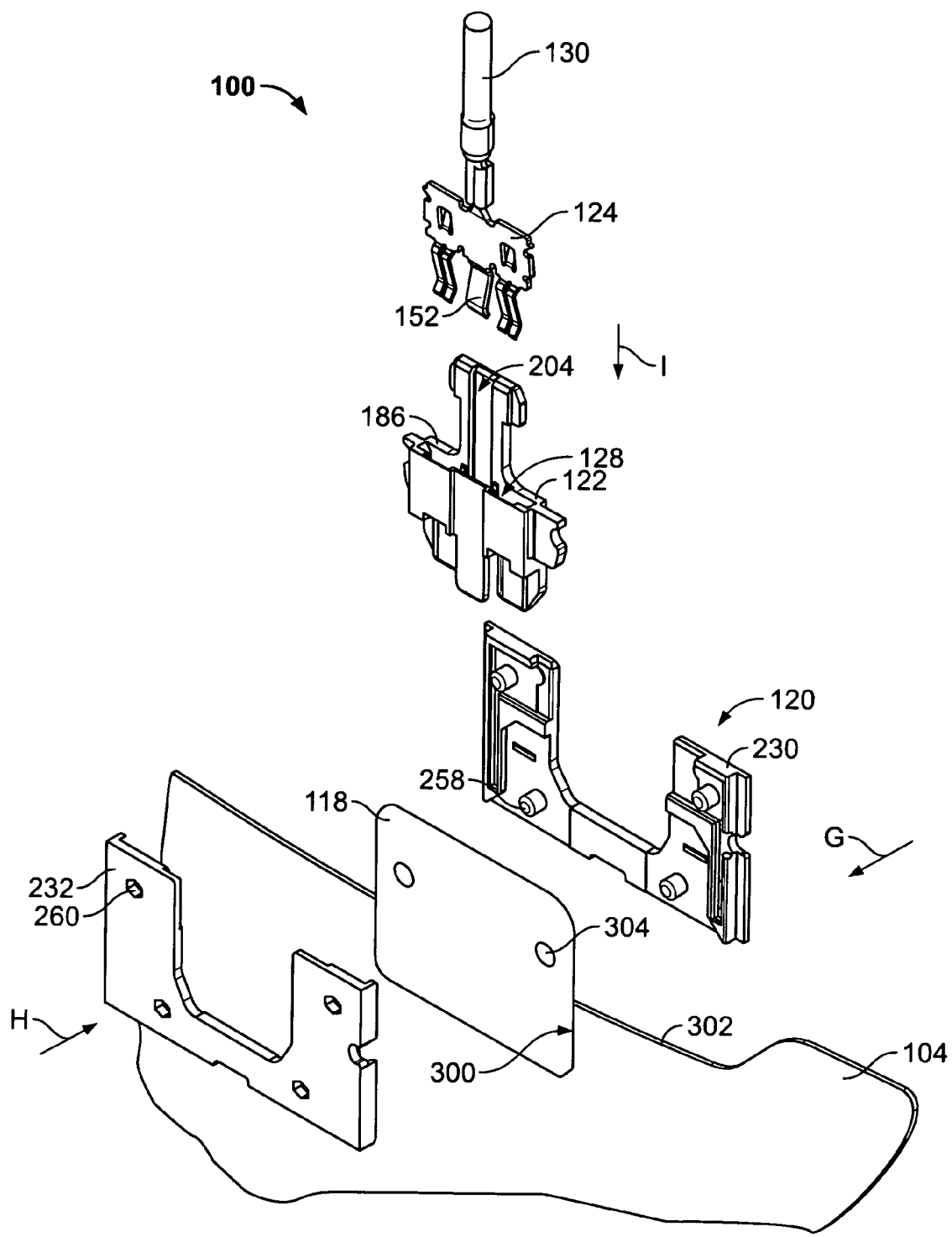
FIG. 6 is an exploded perspective view of the connector assembly illustrating an initial stage of an assembly process of the connector assembly.

FIG. 6 is an exploded perspective view of the connector assembly 100 illustrating an initial stage of an assembly process of the connector assembly 100. In the illustrated embodiment, the conductive plate 104 includes the plate contact 118. Optionally, the plate contact 118 may be separately provided from the plate 104 and attached thereto using a known attachment method. For example, in the illustrated embodiment, the plate 104 includes a notched out portion 300 depending inward from a mounting edge 302 of the plate 104. The plate contact 118 is received within the notched out portion 300 and is secured thereto, such as by a welding or soldering process. As described above, once assembled, the plate contact 118 is elevated from the mounting edge 302 of the plate 104 and defines a tab for engagement with the contact 124. As further described above, the plate contact 118 may be integrally formed with the plate 104 such that the plate 104 merely includes a plate contact portion that defines a tab for engagement with the contact 124. In alternative embodiments, rather than having a tab that extends upwardly from the mounting edge 302, a top surface of the plate contact 118 may be flush with the mounting edge 300 of the plate 104 and the contact 124 may engage the plate contact 118 below the mounting edge 300. Similarly, the plate contact 118 may be recessed with respect to the mounting edge 300 of the plate 104. Optionally, the plate contact 118 and the plate 104 may have the same thickness.

In the illustrated embodiment, the plate contact 118 includes plate apertures 304 extending therethrough. An initial assembly step includes mounting the alignment housing 120 to the plate contact 118. For example, the first housing portion 230 is attached to the plate contact 118 by loading the dowel pins 258 of the first housing portion 230 through the plate apertures 304, such as in a mating direction illustrated by arrow G. The second housing portion 232 is attached to the first housing portion 230 and the plate contact 118 by loading the dowel pins 258 into the receptacles 260 in the second housing portion 232. The second housing portion 232 is mated along a mating direction shown by arrow H. By loading the dowel pins 258 through the plate apertures 304, the alignment housing 120 may be securely coupled to the plate contact 118. In the illustrated embodiment, four dowel pins 258 and four corresponding receptacles 260 are provided. Only two plate apertures 304 are provided, and two of the four dowel pins 258 are received in the plate apertures 304. Alternatively, more or less dowel pins 258, receptacles 260 and plate apertures 304 may be provided.

Another initial assembly step of the connector assembly 100 includes mating the contact 124 and the plug housing 122. The contact 124 is loaded into the contact chamber 128 through the contact mating face 186, such as in the loading direction illustrated by arrow I. The contact 124 is loaded such that the center contact beam 152 fits within the slot 204 of the plug housing 122. The wire 130 extends from the contact 124.

Figure 7:
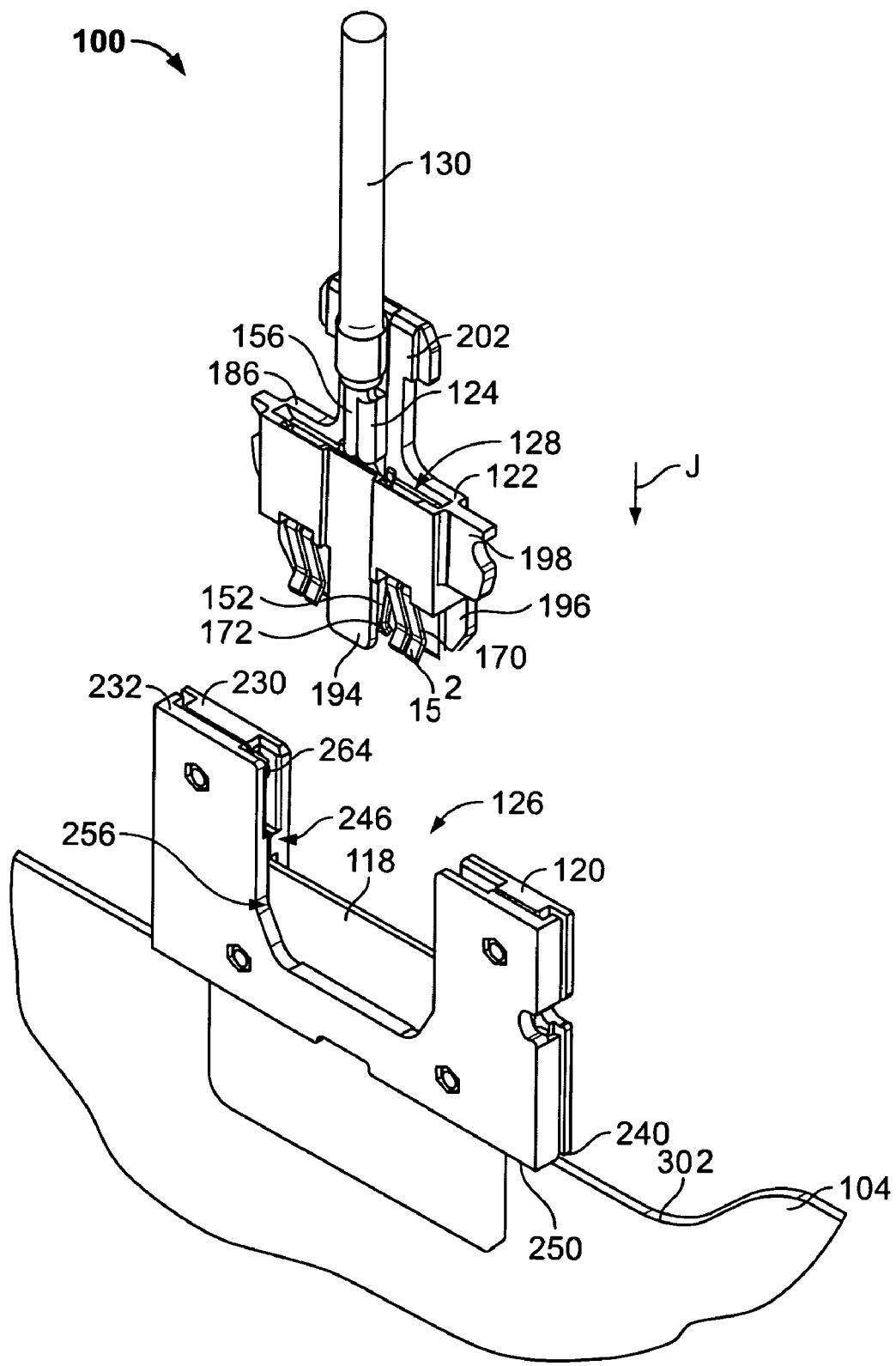
FIG. 7 is an exploded perspective view of the connector assembly illustrating another stage of an assembly process of the connector assembly.

FIG. 7 is an exploded perspective view of the connector assembly 100 illustrating another stage of an assembly process of the connector assembly 100. As illustrated in FIG. 7, the alignment housing 120 is attached to the plate contact 118 and the contact 124 is loaded into the plug housing 122. A portion of the plate contact 118 is accessible through the openings 246, 256 in the first and second housing portions 230, 232. The plate mating faces 240, 250 engage the mounting edge 302 of the plate 104.

As further illustrated in FIG. 7, the contact 124 is positioned within the plug housing 122 such that the center contact beam 152 is aligned with the center flange 194 and the outer contact beams 154 are aligned with the outer flanges 196. Optionally, the contact surface 172 of the center contact beam 152 engages the center flange 194 and the contact surfaces 170 of the outer contact beams 154 engage the outer flanges 196. The wire termination portion 156 extends upwardly from the contact mating face 186 along the insulation tab 202.

During mating of the plug housing 122 and the alignment housing 120, the plug housing 122 is loaded along a loading direction, shown by arrow J. The mounting arms 198 of the plug housing 122 engage the plug mounting tabs 264 of the alignment housing 120 to retain the plug housing 122 within the alignment housing 120. During mating of the plug housing 122 and the alignment housing 120, the contacts 152, 154 engage the plate contact 118. In different embodiments, the plug housing 122 may be loaded into the receiving chamber 126 prior to loading the contact 124 into the contact chamber 128 or the alignment housing 120 may be secured to the plate contact 118 after the plug housing 122 and the contact 124 are connected to the plate contact 118.

Figure 9:
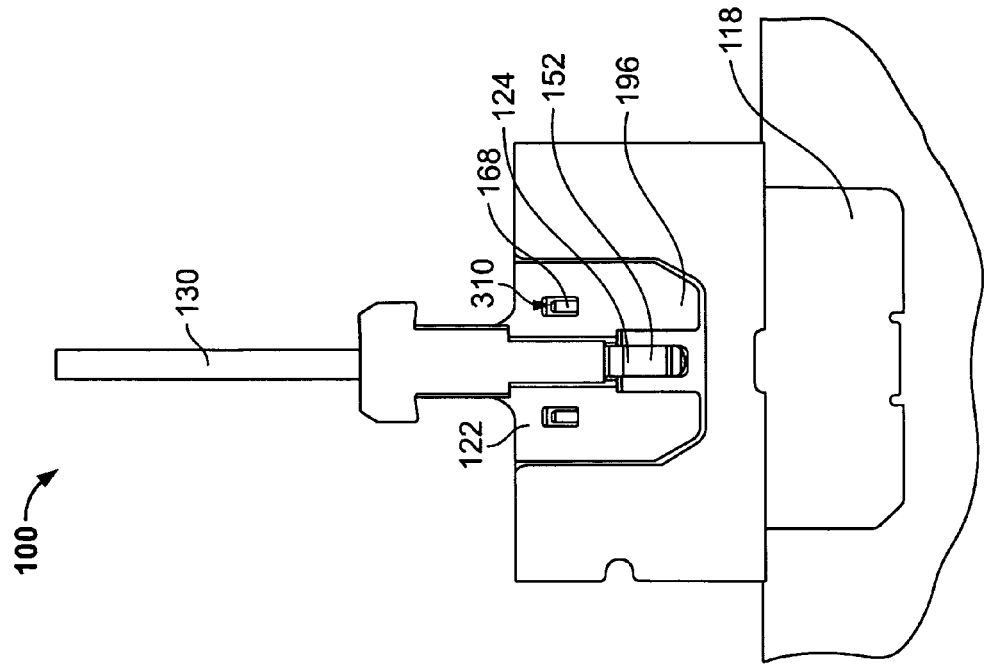
FIG. 9 is a rear elevation view of the connector assembly in an assembled state.
Figure 8:
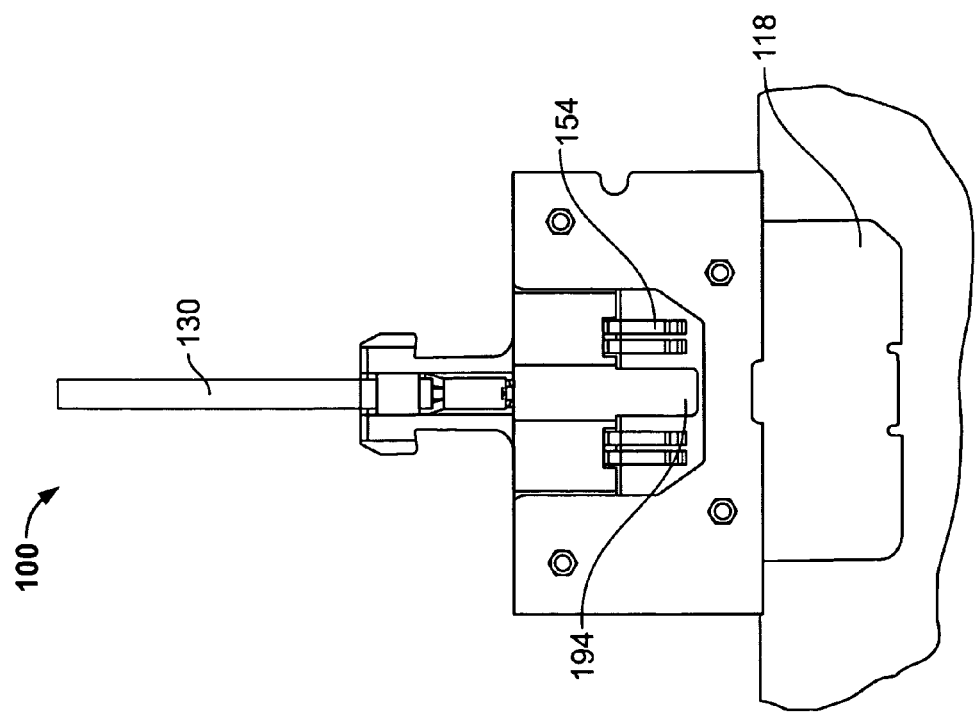
FIG. 8 illustrates a front elevation view of the connector assembly in an assembled state.

FIG. 8 illustrates a front elevation view of the connector assembly 100 in an assembled state. FIG. 9 is a rear elevation view of the connector assembly 100 in an assembled state. As illustrated in FIG. 8, the outer contact beams 154 and the center flange 194 extend along and engage the first surface 114 of the plate contact 118. The outer contact beams 154 are deflected by the plate contact 118, which produces a normal force on the first surface 114 of the plate contact 118. As illustrated in FIG. 9, the center contact beam 152 and the outer flanges 196 engage the second surface 116 of the plate contact 118. The center contact beam 152 is deflected by the plate contact 118, which produces a normal force on the second surface 116 of the plate contact 118. The normal force created by the center contact beam 152 is generally opposite the normal force created by the outer contact beams 154, and the contact 124 may be securely engaged to the plate contact 118 by the opposing contact normal forces.

As further illustrated in FIG. 9, the plug housing 122 includes windows 310 therethrough. The lances 168 of the contact 124 extend into the windows 310 to secure the contact 124 within the plug housing 122. The contact 124 may be removed from the plug housing 122 by depressing the lances 168 and pulling the contact 124 upward. The wire 130 extends from the contact 124.

Figure 10:
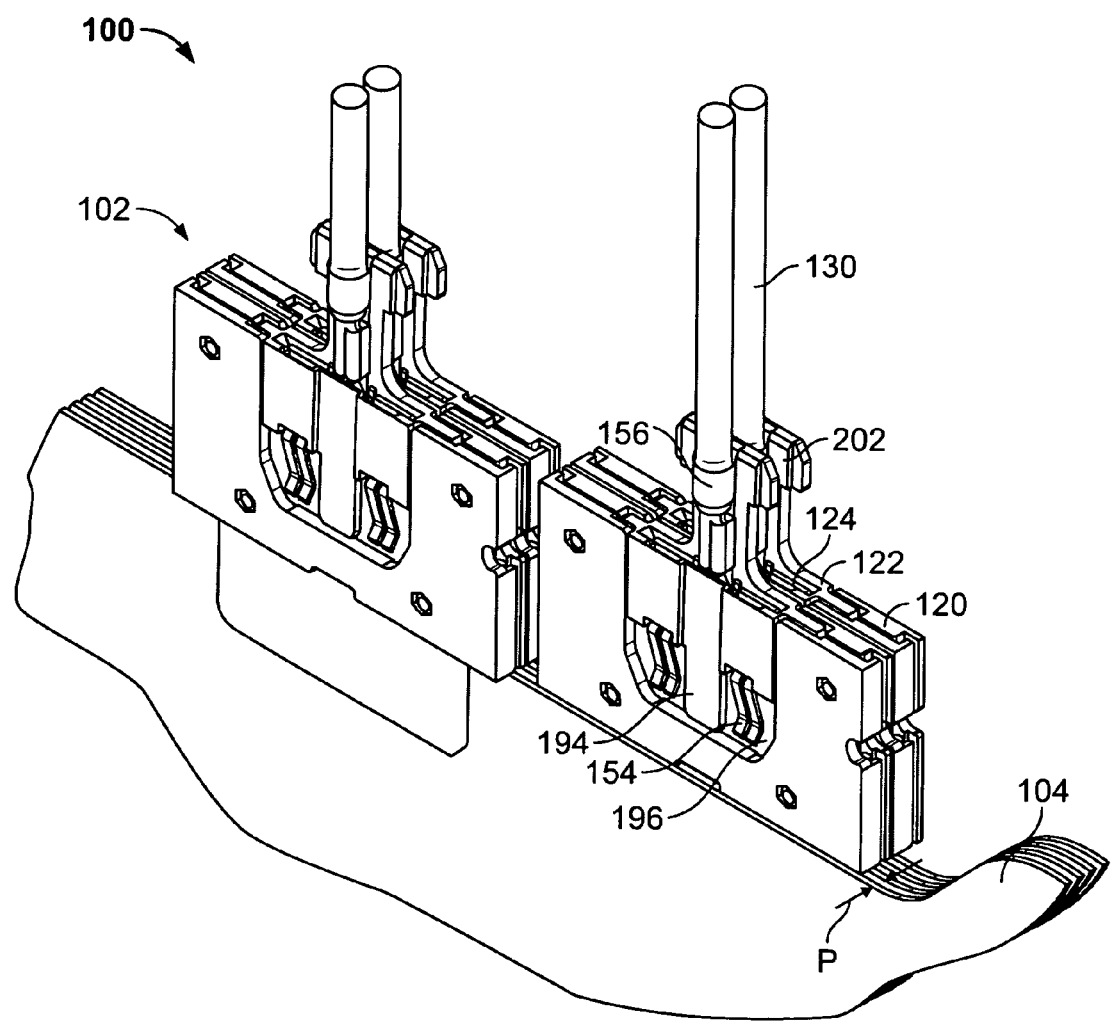
FIG. 10 is a partial perspective view of an exemplary electrical system including multiple connector assemblies.

FIG. 10 is a partial perspective view of the exemplary electrical system 102 including multiple connector assemblies 100. In the illustrated embodiment, four connector assemblies 100 are illustrated. The connector assemblies 100 are arranged in two rows. The connector assemblies 100 coupled to adjacent plates 104 are staggered or off-set. This off-set allows for a tighter spacing of the plates 104. For example, in the illustrated embodiment, the pitch P of the plates 104 is less than the thickness of the corresponding connector assembly 100. As such, more plates 104 and more connector assemblies 100 may be fit within a given space. In alternative embodiments, more than two rows of connector assemblies 100 may be provided for even tighter stacking or easier assembly.

Optionally, the connector assemblies 100, and particularly the alignment housings 120, are coupled to the respective plates 104 before the plates 104 are stacked. Thus adequate room is provided to fit the housing portions together. Once the plates 104 are stacked, adjacent connector assemblies 100 are positioned next to one another. Optionally, the spacing of the stack may allow the connector assemblies 100 to touch one another. In the exemplary embodiment, the alignment housings 120 and the plug housings 122 are insulative to protect conductive components of adjacent connector assemblies 100 from touching, thus preventing shorting of the system 102. For example, the plug assembly 122 completely surrounds the body of the contact 124. The insulation tab 202 is provided to insulate the wire termination portion 156 from adjacent wire termination portions 156 within the stack. The center flange 194 is provided to insulate the center contact beam 152 from adjacent center contact beams 152 (shown in FIG. 2). The outer flanges 196 are provided to insulate the outer contact beams 154 from adjacent outer contact beams 154.

A connector assembly 100 is therefore provided which reliably connects conductive plates to external equipment while avoiding the aforementioned problems. A reliable, long term contact system is therefore provided for use with, for example, fuel cell stacks which are not compatible with existing connector systems. A contact 124 is provided that includes redundant contact beams 152, 154 that provide oppositely directed normal forces against a plate 104 of the fuel cell. The contact beams 152, 154 ensure mechanical and electrical connection of the contacts 124 with the plates 104.

Superior electrical and mechanical connection to the plates 104 is therefore provided. An alignment housing 120 is securely coupled to the plate 104, and a plug housing 122 is separately provided from and received within the alignment housing 120. The contact 124 is received within the plug housing 122 and is oriented to engage the plate 104. Flanges 194 and 196 of the plug housing 122 prevent adjacent contacts 124 from shorting one another in the stack.

While the invention has been described in terms of various specific embodiments, those skilled in the art will recognize that the invention can be practiced with modification within the spirit and scope of the claims.

What is claimed is:

1. A connector assembly for mating with a self-supporting conductive plate, the plate is formed with a plate mounting edge and first and second surfaces extending from the plate mounting edge, the connector assembly comprising:
    an alignment housing configured to be mounted to, and supported by, the plate at the plate mounting edge, the alignment housing defining a receiving chamber therein; and
    a plug housing having a contact held therein, the plug housing received within the receiving chamber such that the contact slidably engages the first surface and the second surface of the plate.

2. A connector assembly in accordance with claim 1 wherein the contact comprises a first contact beam and a second contact beam, the first contact beam configured to engage the first surface of the plate when passed over the plate mounting edge, and the second contact beam configured to engage the second surface of the plate when passed over the plate mounting edge.

3. A connector assembly in accordance with claim 1 wherein the alignment housing comprises a first housing portion and a second housing portion,—the first housing portion having a dowel pin extending therefrom and the second housing having an opening therein aligned with and receiving the dowel pin during mating of the first and second housing portions, and wherein the plate includes a plate opening therethrough, the dowel pin extending through the plate opening for retaining the alignment housing to the plate.

4. A connector assembly in accordance with claim 1 wherein the plug housing comprises an insulation member extending from a surface of the plug housing, wherein the insulation member extends along a portion of the contact.

5. A connector assembly in accordance with claim 1 wherein the plug housing is removably coupled to the alignment housing.

6. A connector assembly in accordance with claim 1 wherein the plug housing includes mounting arms extending from opposed sides of the plug housing, the mounting arms snappably engage the alignment housing.

7. A connector assembly for mating with a conductive plate, the plate includes a plate mounting edge and first and second surfaces extending from the plate mounting edge, and the plate includes first and second mounting apertures, the connector assembly comprising:
    a contact comprising first and second contact beams, the first and second contact beams configured to engage opposite surfaces of the plate adjacent the plate mounting edge;
    an alignment housing having first and second dowel pins, the dowel pins configured to be received in the first and second mounting apertures for mounting to the respective plate at the plate mounting edge, the alignment housing defining a receiving chamber therein; and a plug housing having the contact held therein, the plug housing received within the receiving chamber such that the contact slidably engages the first surface and the second surface of the plate.

8. A connector assembly in accordance with claim 7 wherein the alignment housing includes a first housing portion and a second housing portion, the first housing portion having at least one of the dowel pins, and the second housing portion having at least one opening aligned with the and receiving corresponding ones of the dowel pins during mating of the first and second housing portions.

9. A connector assembly in accordance with claim 7 wherein the contact includes a wire termination portion configured to directly couple to a wire, the plug housing comprises an insulation tab extending from a surface of the plug housing, wherein the insulation tab extends along the wire termination portion.

10. A connector assembly in accordance with claim 7 wherein the plug housing comprises at least one insulation flange extending from a surface of the plug housing, wherein each insulation flange extends along one of the first and second contact beams.

11. A connector assembly in accordance with claim 7 wherein the plug housing is removably coupled to the alignment housing.

12. A connector assembly in accordance with claim 7 wherein the contact is removably coupled to the plug housing.

13. A connector assembly in accordance with claim 7 wherein the plug housing includes mounting arms extending from opposed sides of the plug housing, the mounting arms being differently shaped for keying assembly with the alignment housing.

14. A connector assembly in accordance with claim 1 wherein the alignment housing has substantially planar, and opposed, sides extending from a mounting end connecting the sides, the mounting end is mounted to the plate mounting edge, and wherein the plug housing has opposed sides that are substantially co-planar with the alignment housing sides.

15. A connector assembly in accordance with claim 1 wherein the plate includes an upper edge extending along a length, wherein a portion of the upper edge defines the plate mounting edge, the alignment housing is mounted to the area defining the plate mounting edge of the upper edge such that at least a portion of the upper edge is exposed beyond both sides of the alignment housing along the length.

16. A connector assembly in accordance with claim 1 wherein the plate includes an upper edge and a mounting tab separately provided from, and coupled to, the plate at the upper edge, wherein the alignment housing is coupled to the mounting tab.

17. A connector assembly in accordance with claim 1 wherein the alignment housing has substantially planar, and opposed, sides that are substantially parallel with the first and second surfaces of the plate when the alignment housing is mounted to the plate, wherein the alignment housing has a thickness between the sides of the alignment housing that is approximately the same as a thickness of the plate between the first and second surfaces.

18. A connector assembly in accordance with claim 1 wherein the alignment housing is configured to be mounted to a single housing and includes a single receiving chamber for receiving a single plug assembly and a single contact.

19. A connector assembly in accordance with claim 1 wherein the plug housing includes opposed first and second sides, the first side having a first flange extending therefrom and the second side having a second flange extending therefrom in a similar direction as the first flange, wherein the contact is received within the plug housing such that the first contact and the first flange are configured to capture the plate therebetween and the second contact and the second flange are configured to capture the plate therebetween.

20. A connector assembly in accordance with claim 1 wherein the plate comprises a fuel cell plate, the contact being connected to the fuel cell plate for monitoring a status of the fuel cell plate.

* * * * *